May 10, 1927.
W. M. BRISTOL
1,627,884
METHOD OF MOLDING FRUIT JUICE EXTRACTORS
Filed Dec. 16, 1924   2 Sheets-Sheet 1
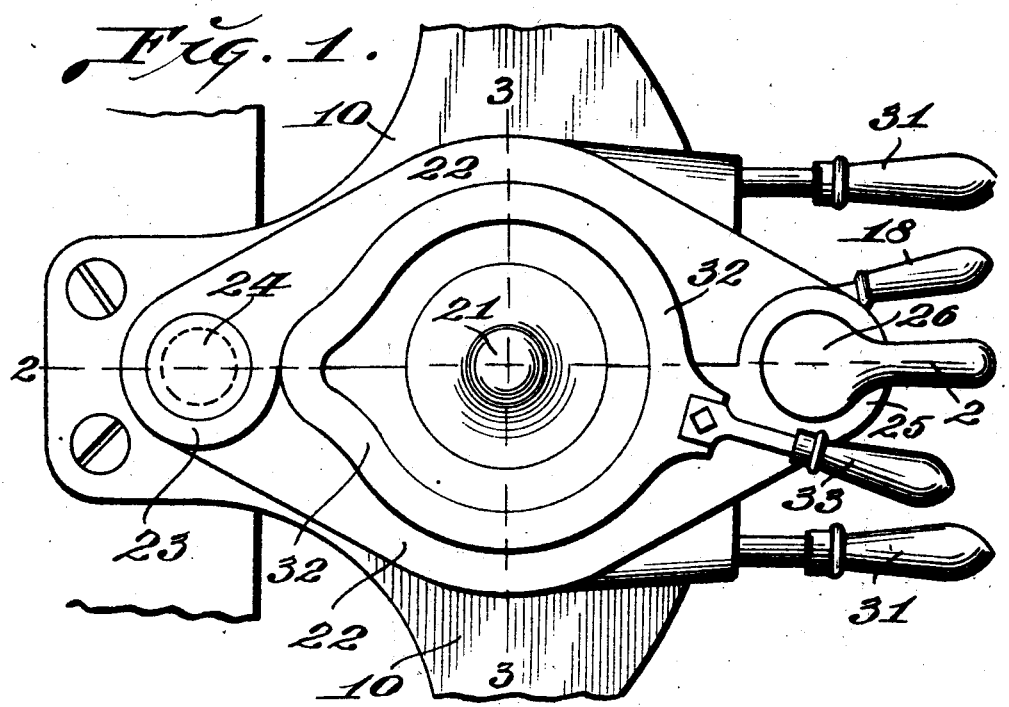
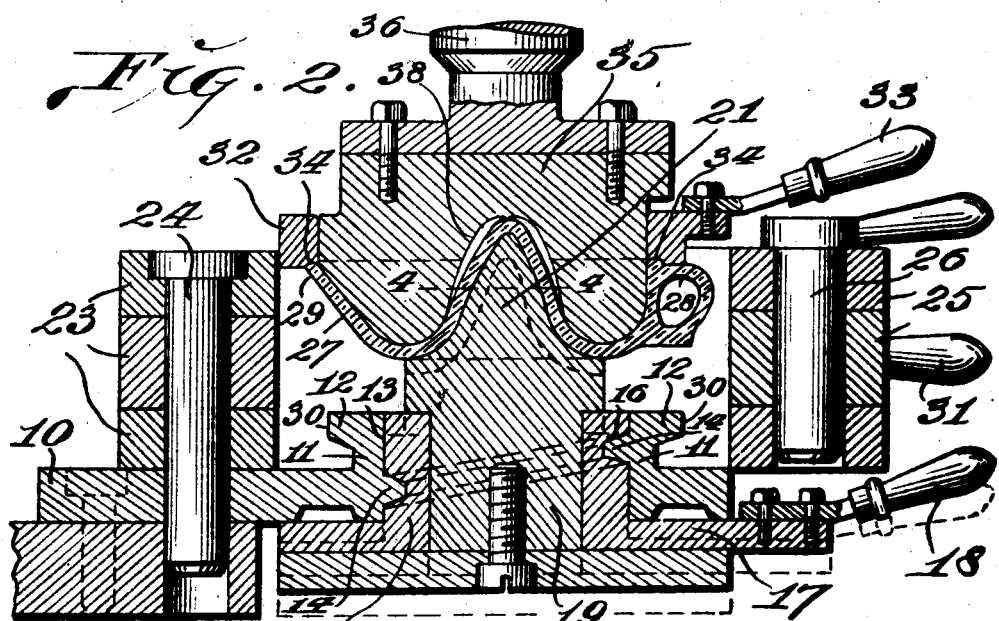
Inventor:—
William M. Bristol.
By Martin Smith Atty.

May 10, 1927.  1,627,884
W. M. BRISTOL
METHOD OF MOLDING FRUIT JUICE EXTRACTORS
Filed Dec. 16, 1924   2 Sheets-Sheet 2
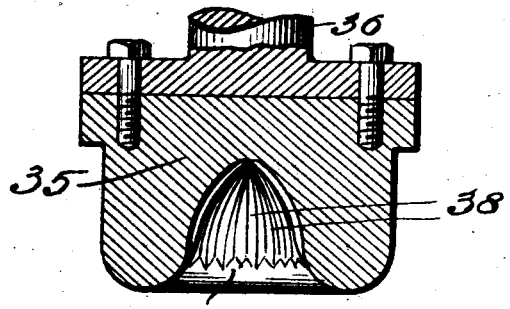
Fig. 3
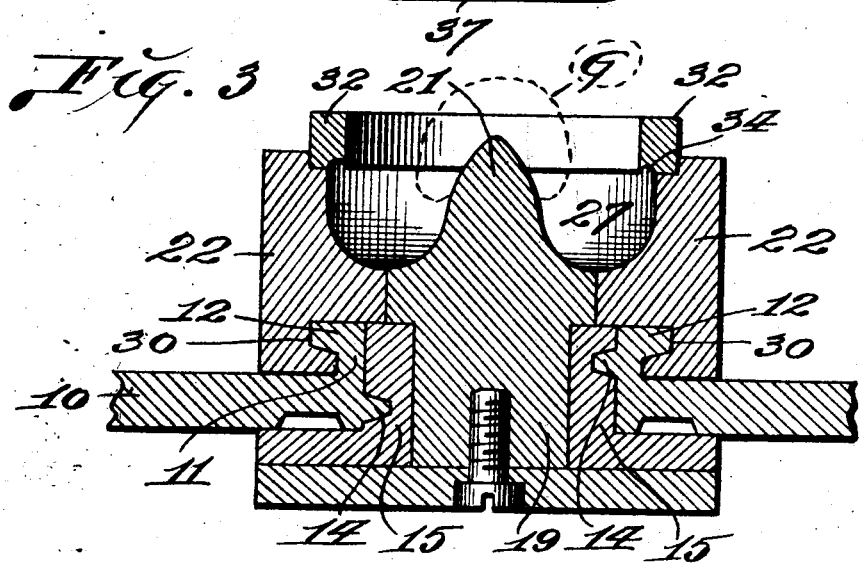
Fig. 4.
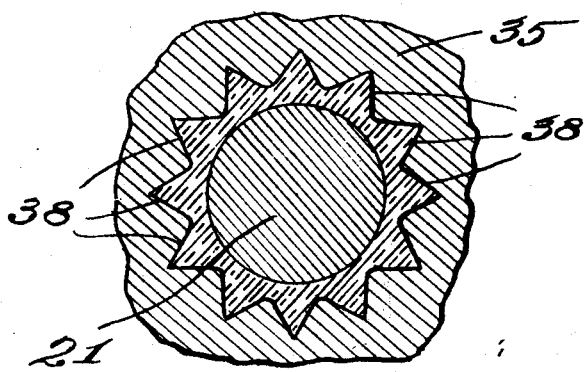
Inventor:—
William M. Bristol.
By Martin J. Smith, Atty.

Patented May 10, 1927.

1,627,884

UNITED STATES PATENT OFFICE.

WILLIAM M. BRISTOL, OF HIGHLAND, CALIFORNIA, ASSIGNOR TO CALIFORNIA FRUIT GROWERS EXCHANGE, OF LOS ANGELES, CALIFORNIA, A CORPORATION OF CALIFORNIA.

METHOD OF MOLDING FRUIT-JUICE EXTRACTORS.

Application filed December 16, 1924. Serial No. 756,216.

My invention relates generally to molding and more particularly to a method of molding with a sectional mold that is used for the production of glass citrus fruit juice extractors and particularly the type of extractor that forms the subject matter of my co-pending application for U. S. Letters Patent, filed March 19th, 1924, Ser. No. 702,923.

The extractor I employ in using my molding method is especially designed for use in extracting the juice from oranges, lemons, grape fruit or other citrus fruits, and said extractor comprises a substantially bowl-shaped body having a handle on one side, a pouring lip or spout on the opposite side and a centrally arranged conical member that is provided on its outer surface with ribs or corrugations having relatively sharp edges.

In so far as I am aware, it has always been the practice to construct the molds for producing fruit juice extractors so that the extractor is inverted when pressed and formed within the mold cavity.

This method of production has certain manufacturing disadvantages, due principally to the tendency of the glass to cool and harden before it flows from the deep central portion of the mold cavity upwardly and outwardly to the outer portion of said cavity.

Further, the methods and molds heretofore employed in the production of citrus fruit juice extractors, have not been successful in producing the desired sharp edges on the ribs or corrugations of the central portion of the extractor.

It is the principal objects of my invention to provide a method of molding with a sectional mold that will be effective in overcoming the objectionable results just noted.

With the foregoing and other objects in view, my invention consists in the novel method that will be hereinafter more fully described and claimed and illustrated in the accompanying drawings in which:

Fig. 1 is a top plan view of a mold constructed in such a way as to facilitate the practice of my invention.

Fig. 2 is a vertical section taken on the line 2—2 of Fig. 1 and showing the plunger portion of the mold in its lowermost position.

Fig. 3 is a cross section taken on the line 3—3 of Fig. 1 with the plunger in raised or elevated position.

Fig. 4 is an enlarged horizontal section taken on the line 4—4 of Fig. 2.

Referring by numerals to the accompanying drawings, 10 designates a bed plate that is rigidly supported in any suitable manner.

Formed on top of this plate is a circular lug 11 provided on its upper portion with an outwardly projecting flange 12 and formed through said plate and lug is a circular opening 13. Formed on the face of the wall surrounding this opening is a helical rib or thread 14.

Arranged to rotate and slide through opening 13 is a collar 15, in the outer face of which is formed a spirally disposed groove 16 that receives rib or thread 14 and formed integral with the lower end of this collar is a plate 17 to the forward end of which is secured a handle 18.

Fitting snugly within collar 15 is the lower portion of a cylindrical plug 19 and the lower end of the latter is secured in any suitable manner to a plate 20 that is fitted to the under side of plate 17.

The upper portion 21 of plug 19 constitutes a core for the hollow cone of the extractor and is made substantially conical in shape, with a blunt apex and this conical portion gives shape to the under side of the central portion of the extractor that is pressed in the mold.

The body of the mold comprises a pair of blocks 22 that are substantially semi-circular in form when viewed in plan and formed on the rear ends of said blocks are overlapping ears 23 that are perforated to receive a hinge pin 24 and the lower end of the latter being seated in bed plate 10.

Formed on the front ends of mold blocks 22 are overlapping ears 25 that are perforated to receive a removable pin 26, the latter serving to lock the mold blocks when closed.

The upper inner portions of blocks 22 are cut away to form the mold cavity 27, the surface of the latter giving shape to the outer portion of the under face of the extractor that is pressed in the mold.

On one side of this mold cavity and in the meeting faces of the mold sections 22 is formed a substantially circular chamber 28 that shapes the handle of the extractor, and on the opposite side, the cavity is extended as designated by 29 to shape the pouring lip or spout.

Formed in the lower portions of the inner faces of the mold blocks 22 are grooves 30 that receive the flange 12 of lug 11 when the mold is closed and secured on the front ends of the mold blocks are handles 31, by means of which said blocks are swung apart into open position or together in closed position.

A top ring 32 is provided with a handle 33 and said ring is adapted to be positioned on the mold blocks directly over the edge of the mold cavity when said blocks are closed and formed in the under side of this ring adjacent to its inner edge is a groove 34 that forms a bead or rounded edge on the top of the outer wall of the molded or pressed extractor.

The upper or plunger portion of the mold comprises a pressure block 35 that is secured in any suitable manner to the lower end of a vertically movable member 36 and said block is of such size and shape that it will pass through top ring 32.

The under face of the plunger is formed so as to give proper shape to the upper face of the extractor that is pressed in the mold cavity and the central portion of said under face is formed with a deep conical recess 37 that receives and cooperates with conical member 21 in giving form to the conical central portion of the extractor or that portion onto which the fruit is pressed when extracting the juices therefrom.

The surface of the conical recess 37 is formed with grooves 38 that are substantially V-shape in cross section and which radiate from the bottom of said recess downwardly toward the annular lower end of the plunger block. These grooves are effective in producing V-shaped ribs on the conical central portion of the extractor that is pressed in the mold.

The operations incident to the formation of an extractor according to my method, are as follows:

The blocks 22 are moved together into closed position and locked by the engagement of pin 26 in the apertures in ears 25.

The plate 17 is slightly rotated by means of handle 18 and, as a result of the threaded engagement between the collar 15 and lug 12, block 19 and its conical upper portion or core 21 is moved to the upper limit of travel.

The top ring 32 is now positioned on the mold body and after plunger 35 has been elevated as illustrated in Fig. 3, a ball of molten glass is placed on top of conical member 21 as illustrated by dotted lines G, Fig. 3.

The tendency of this molten mass of glass is to flow downwardly over conical member 21 and, as plunger 35 is lowered under pressure, the molten glass will be forced uniformly outward through all portions of the mold cavity, thereby shaping said glass into the finished product.

In the downward movement of the plunger 35, the ribbed conical recess is the first portion thereof that contacts with the molten glass and, as a result, the said glass will readily fill the V-shaped grooves 38, so as to produce on the conical portion of the finished extractor the desired sharp edges.

In view of the fact that the cooling glass tends to contract slightly the conical central portion of the extractor would crack and break if the conical portion 21 of plug 19 were to remain in fixed position after a molding or pressing operation.

In order to permit this shrinkage to take place, plug 19 and its conical upper portion 21 is mounted so that it may be readily moved downward a short distance immediately after each molding or pressing operation, and this downward movement is accomplished by slightly rotating plate 17, the collar 15 of which has threaded engagement with lug 11 on fixed plate 10.

After plug 19 has thus been lowered and the molded article has become sufficiently hard to handle, plunger 35 is elevated, top ring 32 removed, pin 26 withdrawn and blocks 22 swung apart to permit the finished extractor to be engaged with suitable tools and lifted from the mold.

Thus it will be seen that I have provided a relatively simple and practical method of molding that may be advantageously employed in the production of glass fruit juice extractors, the mold that I use being constructed so that the extractor when given form in the mold cavity is pressed or molded right side uppermost, thus facilitating production and eliminating certain manufacturing disadvantages that occur where the extractors are pressed or molded upside down.

It is understood that the embodiment of the invention described herein is only one of the many embodiments this invention may take, and I do not wish to be limited in the practice of the invention, nor in the claims, to the particular embodiment set forth.

I claim as my invention:

1. The method of molding a glass fruit-juice extractor, having an upwardly projecting cone in a mold having an upwardly projecting substantially conical core, which consists in placing a ball of glass on top of the core, confining the ball of glass and compressing the same down into the mold from above.

2. The method of molding a glass fruit-juice extractor, having an upwardly projecting cone in a mold having an upwardly projecting substantially conical core, which consists in placing a ball of glass on top of the core, confining the ball of glass and compressing the same down into the mold from above, and withdrawing the core before the glass in the mold hardens.

In testimony whereof I affix my signature.

WILLIAM M. BRISTOL.